J. M. MITCHELL.
Brick-Machines.
No. 145,358.
Patented Dec. 9, 1873.
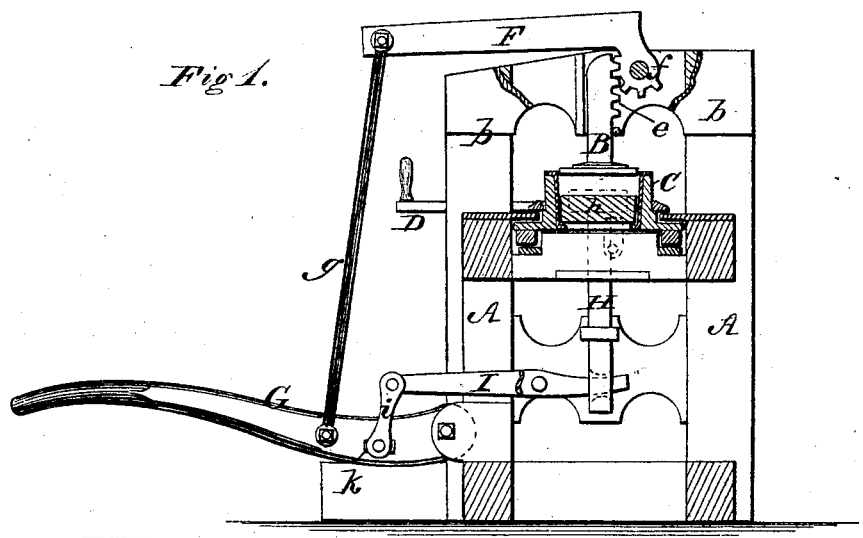
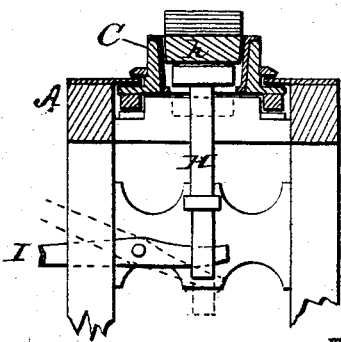
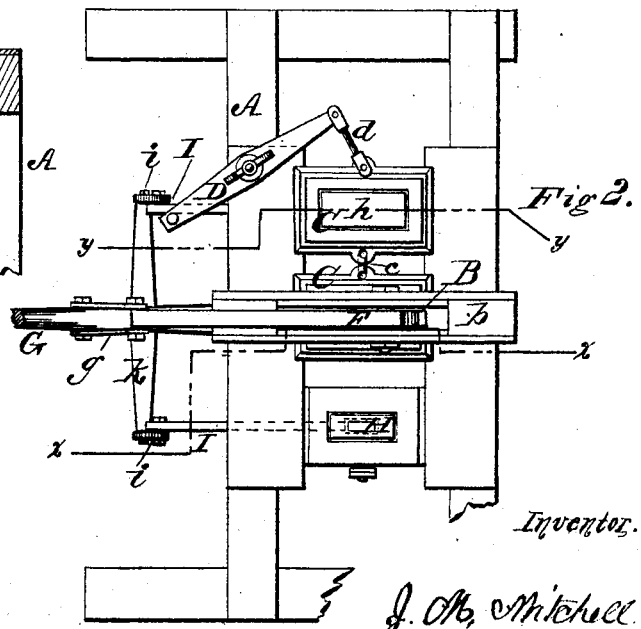
Witnesses.
Harry King.
W. H. Dodge.
Inventor.
J. M. Mitchell
By his att'ys
Dodge & Son

UNITED STATES PATENT OFFICE.

JAMES M. MITCHELL, OF DUNLAP, IOWA.

IMPROVEMENT IN BRICK-MACHINES.

Specification forming part of Letters Patent No. 145,358, dated December 9, 1873; application filed April 4, 1873.

*To all whom it may concern:*

Be it known that I, J. M. MITCHELL, of Dunlap, in the county of Harrison and State of Iowa, have invented certain Improvements in Brick-Presses, of which the following is a specification:

My invention relates to a hand-press for molding brick, &c.; and consists in a novel combination of mechanism, in which a single movement of a hand-lever presses one brick, and delivers the previous one from its mold.

Figure 1 is a vertical section of my machine on the line $x\ x$ of Fig. 2; Fig. 2, a top-plan view of the machine; Fig. 3, a vertical section on the line $y\ y$ of Fig. 2, showing the manner in which the bricks are delivered from the mold.

In the drawing, A represents a strong rectangular frame, constructed at the middle with an upright portion, $d$, in which there is mounted a vertical plunger, B, as shown in Figs. 1 and 2. On the top of the frame A there are mounted two horizontally-sliding mold-frames, C, which may be moved to and fro, so as to come alternately under the plunger B. These molds are united by a link, $c$, and are moved by a hand-lever, D, which is pivoted to the frame and connected by a link, $d$, to one of the molds, as shown in Fig. 1. The plunger B is made with a rack, $e$, on one side, and is moved up and down by a pinion, $f$, formed on the end of a lever, F, which is pivoted in the top of the frame, as shown in Figs. 1 and 2. The lever F extends forward and has its end connected by a rod, $g$, to a hand-lever, G, which is pivoted to the front of the frame in convenient reach of the operator, so that by depressing the lever the plunger may be forced down into whichever mold may chance to be under it.

In order to admit of the ejectment of the brick from the molds, the latter are made with movable bottoms, $h$, which may be pushed up from below. In opposite ends of the frame there are mounted below the level of the molds two plungers, H, to push up the mold-bottoms. These plungers H are operated by levers, I, pivoted to the frame, the inner ends of the levers being passed through the respective plungers, while their outer ends are connected by the links $i$ to a cross-bar, $k$, secured to the hand-lever G, as shown in Figs. 1, 2, and 3, so that when the said lever is depressed to force the compressing-plunger B down, it at the same time raises both delivering-plungers. The arrangement of parts is such that when either mold is under the pressing-plunger the other is over its corresponding delivery-plunger.

The machine is operated as follows: After a brick is pressed in one mold, the other mold is filled with clay, and then the molds moved by the lever D until the one containing clay is under the pressing-plunger B, and the one containing brick over its delivery-plunger. The hand-lever H, being then depressed, brings down the plunger B and compresses the clay in the one mold, and at the same time raises the delivery-plunger and ejects the brick from the other mold, the brick being immediately removed by an attendant. The lever is then raised so as to lift the pressing-plunger and lower the others, and the mold from which the brick was delivered filled with clay. The molds are then moved back to their first position, the hand-lever again operated, and so on repeatedly, the two molds being brought alternately under the pressing-plunger, and each mold brought alternately under said plunger and over the delivery-plunger.

It is obvious that, instead of using two single molds, two sets of molds may be employed, and also that the connection between the hand-lever G and the delivery-plungers may be made in other ways than that shown.

The press constructed on my plan is strong, cheap, and compact, and can be operated with ease and rapidity. It will be found of service for pressing not only brick, but other articles, as soap, &c.

Having thus described my invention, what I claim is—

1. In combination with the movable molds C, the plunger B, lever F, rod $g$, and hand-lever G, constructed and operating as described.

2. In combination with the hand-lever G and the pressing-plunger B, operated thereby, the sliding molds C and the delivering-plungers H, also operated by the hand-lever G, the parts being all constructed and arranged to operate substantially as shown.

JAMES M. MITCHELL.

Witnesses:
S. J. PATTERSON,
H. L. BOND.